US009141708B2

(12) United States Patent
Hungar et al.

(10) Patent No.: US 9,141,708 B2
(45) Date of Patent: Sep. 22, 2015

(54) METHODS FOR GENERATING SELECTION STRUCTURES, FOR MAKING SELECTIONS ACCORDING TO SELECTION STRUCTURES AND FOR CREATING SELECTION DESCRIPTIONS (71) Applicants: Hardi Hungar, Wardenburg (DE); Bernhard Steffen, Dortmund (DE); Tiziana Margaria-Steffen, Dortmund (DE)

(72) Inventors: Hardi Hungar, Wardenburg (DE); Bernhard Steffen, Dortmund (DE); Tiziana Margaria-Steffen, Dortmund (DE)

(73) Assignee: MetaFrame Technologies GmbH, Dortmund (DE)

( * ) Notice: Subject to any disclaimer, the term of this patent is extended or adjusted under 35 U.S.C. 154(b) by 412 days.

(21) Appl. No.: 13/650,680

(22) Filed: Oct. 12, 2012

(65) Prior Publication Data
US 2013/0041865 A1 Feb. 14, 2013

Related U.S. Application Data (63) Continuation-in-part of application No. 11/865,718, filed on Oct. 1, 2007, now abandoned, which is a continuation of application No. 10/468,855, filed as application No. PCT/DE02/00627 on Feb. 21, 2002, now abandoned.

(30) Foreign Application Priority Data

Feb. 23, 2001 (DE) .................................. 101 08 991

(51) Int. Cl.
G06N 5/02 (2006.01)
G06F 17/30 (2006.01)
G06Q 30/06 (2012.01)
G06Q 30/02 (2012.01)

(52) U.S. Cl.
CPC .... *G06F 17/30867* (2013.01); *G06F 17/30893* (2013.01); *G06N 5/02* (2013.01); *G06Q 30/0201* (2013.01); *G06Q 30/0625* (2013.01)

(58) Field of Classification Search
None
See application file for complete search history.

(56) References Cited

U.S. PATENT DOCUMENTS

| 4,648,044 A | 3/1987 | Hardy et al. |
| 4,918,620 A | 4/1990 | Ulug |
| 6,460,036 B1 * | 10/2002 | Herz .............................. 707/748 |
| 6,484,171 B1 * | 11/2002 | Corl et al. ............................ 1/1 |
| 2002/0165701 A1 * | 11/2002 | Lichtenberg et al. ............. 703/7 |
| 2006/0184474 A1 * | 8/2006 | Hatano et al. ................... 706/20 |

OTHER PUBLICATIONS

CUDD: CU Decision Diagram Package Release 2.3.0, Fabio Somenzi, Department of Electrical and Computer Engineering, University of Colorado at Boulder, Sep. 24, 1998, 48 pages.*
Koseki, Y. et al: "Visual Programming Environment for Hybrid Expert Systems" Expert Systems With Applications, vol. 10, No. 3/4, 481-486, 1996, Elsevier, UK.
Bahar, R. et al: "Algebraic Decision Diagrams and Their Applications" IEEE/ACM International Conference on Computer Aided Design, Digest of Technical Papers (ICCAD). Santa Clara, Nov. 7-11, 1993, Los Alamitos, IEEE., Comp. Soc. Press, US 188-191, 1993.

* cited by examiner

*Primary Examiner* — Kakali Chaki
*Assistant Examiner* — Mai T Tran
(74) *Attorney, Agent, or Firm* — The Law Firm of Tong Lee (57) ABSTRACT A real-time system receives a selection structure formed by weighted rules joined by links, each of the weighted rules including a condition part, a conclusion part and a weight. The selection structure is an Algebraic Decision Diagram (ADD) that includes internal nodes, each representing a decision point and terminal nodes, each representing a subset of candidate results having an accumulated weight. In response to a query that specifies a set of conditions, the ADD is traversed by making a series of decisions at decision points of the ADD to reach at least one terminal node having a maximum accumulated weight among terminal nodes that satisfy the set of conditions. The subset of candidate results represented by the at least one terminal node is selected as the output for responding to the query.

18 Claims, 6 Drawing Sheets

R1) Weight 4
IF      VibrationAmplitude      between 9 and 10 micrometers      AND
       VibrationDirection      between 60 and 70 degrees THEN    (IncreaseRotation      by 2000 per minute      OR
        IncreaseRotation      by 4000 per minute      OR
        IncreaseRotation      by 6000 per minute)      AND
        ReleasePressure      by 2% in direction -65 degrees R2) Weight 8
IF      VibrationAmplitude      between 9 and 10 micrometers      AND
       VibrationDirection      between 60 and 70 degrees      AND
       VibrationFrequency      between 6 and 7 KHz      AND
       PressureOfTool      between 80 and 90 p THEN    (IncreaseRotation      by 2000 per minute      AND
        IncreaseRotation      by 4000 per minute      AND
        ReleasePressure      by 2% in direction -65 degrees R3) Weight 15
IF      VibrationAmplitude      between 9 and 10 micrometers      AND
       VibrationDirection      between 60 and 70 degrees      AND
       VibrationFrequency      between 6 and 7 KHz      AND
       RotationOfTool      between 40K and 45K per minute      AND
       PressureOfTool      between 80 and 100 p THEN    DecreaseRotation      by 2000 per minute      AND
        (ReleasePressure      by 2% in direction -65 degrees      OR
        ReleasePressure      by 4% in direction -65 degrees)

R4) Weight 4
IF      VibrationAmplitude      between 9 and 10 micrometers      AND
       VibrationFrequency      below 7 KHz      AND
       RotationOfTool      below 40K per minute THEN    IncreaseRotation      by 2000 per minute      OR
        IncreaseRotation      by 4000 per minute      OR
        IncreaseRotation      by 6000 per minute R5) Weight 2
IF      VibrationAmplitude      between 9 and 10 micrometers      AND
       PressureOfTool      below 85      AND
       RotationOfTool      below 33K per minute THEN    (IncreaseRotation      by 2000 per minute      OR
        IncreaseRotation      by 4000 per minute      OR
        IncreaseRotation      by 6000 per minute)      AND
        (ReleasePressure      by 2% in direction -65 degrees      OR
        ReleasePressure      by 4% in direction -65 degrees)

METHODS FOR GENERATING SELECTION STRUCTURES, FOR MAKING SELECTIONS ACCORDING TO SELECTION STRUCTURES AND FOR CREATING SELECTION DESCRIPTIONS

RELATED APPLICATION

This application claims priority to and is a continuation-in-part application of application Ser. No. 11/865,718 filed on Oct. 1, 2007, which claims priority to and is a continuation application of application Ser. No. 10/468,855 filed on Mar. 1, 2004, which is a National Stage Entry of PCT/DE02/00627 filed on Feb. 21, 2002, which claims priority to German patent application serial no. 101 08 991.0 filed on Feb. 23, 2001.

TECHNICAL FIELD

Embodiments of the invention relate to a method and system for making selections based on a selection structure.

BACKGROUND

Many different applications in a real-time system involve making a decision from a prescribed set of data elements in a current decision situation. In this context, the set of data elements can also include discrete numbers. Information technology offers many kinds of solutions to such problems. One component is computer-related formulation of the selection, which is done using programming languages or using descriptions of selection devices and the associated tools.

There are two different approaches to describing the operation of a real-time system. A first description approach is operational, in which a program is written in the form of precise individual instructions whose execution is precisely stipulated. An example of the first description approach is programs written in a programming language such as the C programming language. A benefit of the first description approach is that through compilation efficient code can be produced. A drawback is that a skilled programmer is needed to write such programs, as users (e.g., administrators or operators of a real-time system, and even more so application experts of the considered real-time domain) generally cannot develop such programs. In addition, the actual effect of a program on the real-time system is typically not easy to comprehend, and the described function can often vary greatly in the case of small changes to the program. This makes creating and changing the description complicated. The second approach is predicative, which describes properties of the desired results and prescribes the flow of calculation indirectly. A benefit of the predicative approach is that users can deliver the description in special areas with appropriate support. With the predicative approach, however, a drawback is that the description usually takes much longer to execute than its operational description counterpart.

Typically, users can create only very simple operational descriptions without mistakes. However, the extended execution time for predicative descriptions is problematic in many respects. The predicative descriptions increase the expense of technical solutions for tasks which need to be carried out under real-time demands, or even make certain technical solutions unachievable.

BRIEF DESCRIPTION OF THE DRAWINGS

The present invention is illustrated by way of example, and not by way of limitation, in the figures of the accompanying drawings in which like references indicate similar elements.

It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 5 illustrates an example of a set of rules for a vibration control system according to one embodiment.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention create a selection description, produce a selection structure from the selection description, and in response to a query select an output from a set of input data elements using the selection structure. The selection structure enables a quick selection even when complex selection functions are involved. This is a considerable improvement over existing solutions, which are unable to evaluate complex selection functions at all, or unable to evaluate them at similar speeds. The selection description includes a collection of rules, which can be defined by experts of a particular application domain who do not have programming expertise (e.g., in the C language). The selection described herein can run much faster than the existing solutions that require online rule evaluation or that are programmed in some programming languages (e.g., the C language).

In one embodiment, the selection description includes a set of weighted rules, which model the properties and operations of a machine, or the preferences or other attributes of a potential customer. The selection structure constructed from the weighted rules is an acyclic, directional tree-like structure, which is also known as an Algebraic Decision Diagram (ADD). To control the size of the selection structure, a number of optimization techniques (e.g., approximation, discretization, parallelization, pipelining, etc.) may be used. At runtime the selection structure can be evaluated quickly by performing a series of Boolean decisions. The selection structure can be described (in terms of weighted rules), queried and evaluated to make a selection by users who are not experts of electronic data processing. In some embodiments, the selection structure may be a generalized ADD that contains varying degrees of fan-outs at the decision points. That is, different internal nodes of the generalized ADD may fan out to different numbers of outputs. This generalized ADD can also be traversed quickly at runtime for performing a series of n-ary decision, where n may be different from one decision point (an internal node of the diagram) to another decision point.

Embodiments described herein may be used for a large number of purposes and in a large number of application contexts. The type and content of the application area influence the form of the results and the design of the selection structure.

Figure 1:
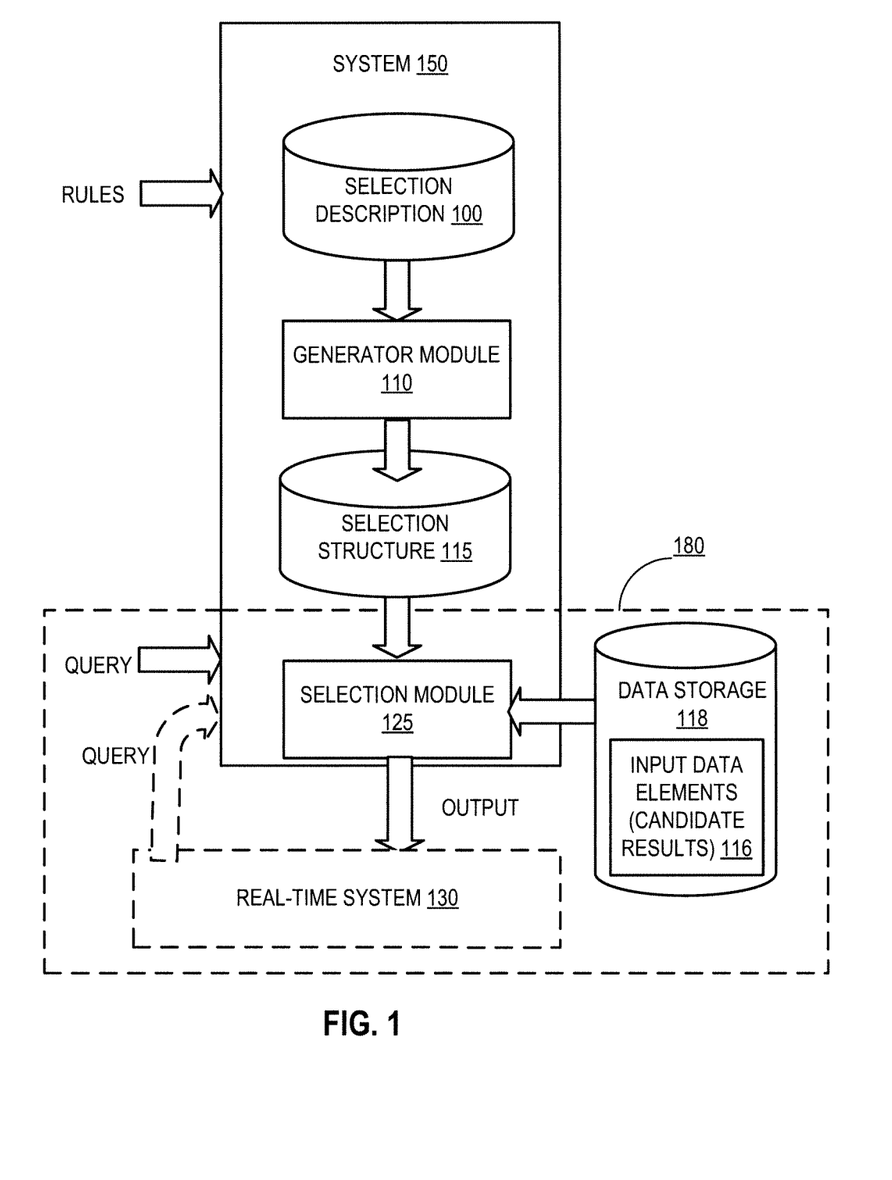
FIG. 1 illustrates an environment in which an embodiment of the invention may operate.

FIG. 1 is a diagram of a system 150 in which embodiments of the invention may operate. The system 150 contains a generator module 110 and a selection module 125. In one embodiment, the system 150 is a control system coupled to a real-time system 130, such as a machine which adapts its operation based on control signals generated by the system 150, or a web server which performs personalized online advertising and/or dynamic compilation of web pages. Other embodiments of the real-time system 130 are also contemplated. The system 150 and the real-time system 130 may be used in a wide range of application areas, as will be described in further detail below.

The generator module 110 receives rules as input. The generator module 110 analyzes the rules, determines which rules can be used together, which rules exclude one another, and other properties as well. The generator module 110 then generates a selection structure 115 for the selection module 125. The selection structure 115 is a decision diagram, which can be traversed very quickly by the selection module 125 during runtime of the real-time system 130. The selection module 125 makes the selection from input data elements 116 (also referred to as "candidate results") to generate an output in response to queries (e.g., sensor data or other real-time data) sent from the real-time system 130, or queries sent by an operator or user of the system 150 or the real-time system 130. In one embodiment, the selection structure 115 is an ADD and the selection module 125 traverses the ADD by making a series of binary (i.e., Boolean) decisions. In one embodiment, the input data elements 116 are a collection of possible selection results stored in a database. The output is either the label of the terminal node reached by traversing the ADD, or an item or a set of items from the candidate results identified by the label of the terminal node. In one embodiment, the database may be stored in a data storage 118 coupled to the selection module 125. The data storage 118 may be volatile or non-volatile random access memory, mass storage devices, or other types of storage devices.

In one embodiment, the selection structure 115 may be represented textually, e.g., as (automatically generated) programs. The selection structure 115 may also be realized by (automatically generated) hardware circuits. The hardware realization has a data flow rather than a control flow character, and is therefore naturally parallel. The selection structure 115 may be realized and traversed in parallel in a synchronized fashion. Such parallel realization may avoid state explosion and can drastically reduce the size of the decision diagram.

In one embodiment, the system 150 includes a graphical user interface that provides a rule editor and/or input templates, which can be used to input the rules and their respective weights under syntax control. In one particular embodiment of the invention, the rules are weighted rules of the form: <argument predicate>→<result predicate>(weight). The rules can also be input character by character, or can be selected from a menu which indicates the available options for the predicates on both sides of the rules. Some of the rules can be quantified, e.g., can be annotated by absolute numbers, percentages, or any numerical indication of relative weights for expressing that some conditions have greater impact on the result than others. These rules form a selection description 100, which is the input to the generator module 110.

After the selection structure 115 is generated, a user can input queries into the system 150, which then displays the selection output in graphically processed form. In one embodiment, various ones of these and other controls and options are implemented. In addition, the output can also be shown in table form. The system 150 can additionally be animated by evaluating the arguments of rules, where the arguments can be selected randomly or stipulated by the user. In this case, the system 150 can display the rules that contribute to the selection result, and/or the rules that did not contribute to the selection result. If a rule has any influence on a result, the system 150 may display which arguments of the rule contribute to this rule influencing the result.

The generator module 110 and the selection module 125 can be implemented in the same processing device or in different processing devices, such as computers, embedded computing devices or elements, etc. Each of the generator module 110 and the selection module 125 module can be implemented in a single processing device or in multiple processing devices. In one embodiment as shown schematically in FIG. 1, the modules 110 and 125 are implemented in one processing device (e.g., operated by a selection service provider), which receives the selection description 100 from another module implemented in another processing device, and sends the selection result to yet another module (e.g., operated by a selection service user) implemented in another processing device (e.g., the real-time system 130). The connection between the these modules can be in the form of a fixed connection, or an on-demand connection which is set up as necessary. The system 150 can include more than one instance of each module. For many applications, a system including more than one selection module 125 can be beneficial. In one embodiment, the system 150 may also be a real-time system. In another embodiment, a real-time system 180 may include the selection module 125, the data storage 118 and the real-time system 130.

In one embodiment, the system 150 can be implemented with general-purpose computers. For example, the system 150 can be implemented with one or more personal computers (PCs) or server computers. Alternatively, the system 150 can be implemented with special-purpose hardware; e.g., Application Specific Integrated Circuit (ASIC), or non-specialized hardware, e.g., Field Programmable Gate Arrays (FPGAs). One form uses replaceable storage media for the selection structure data elements. In one embodiment, the selection module 125 is transportable. In one embodiment, the selection module 125 is a supplementary unit for a PC. In another embodiment, the selection module 125 is contained in an independent apparatus.

Figure 2:
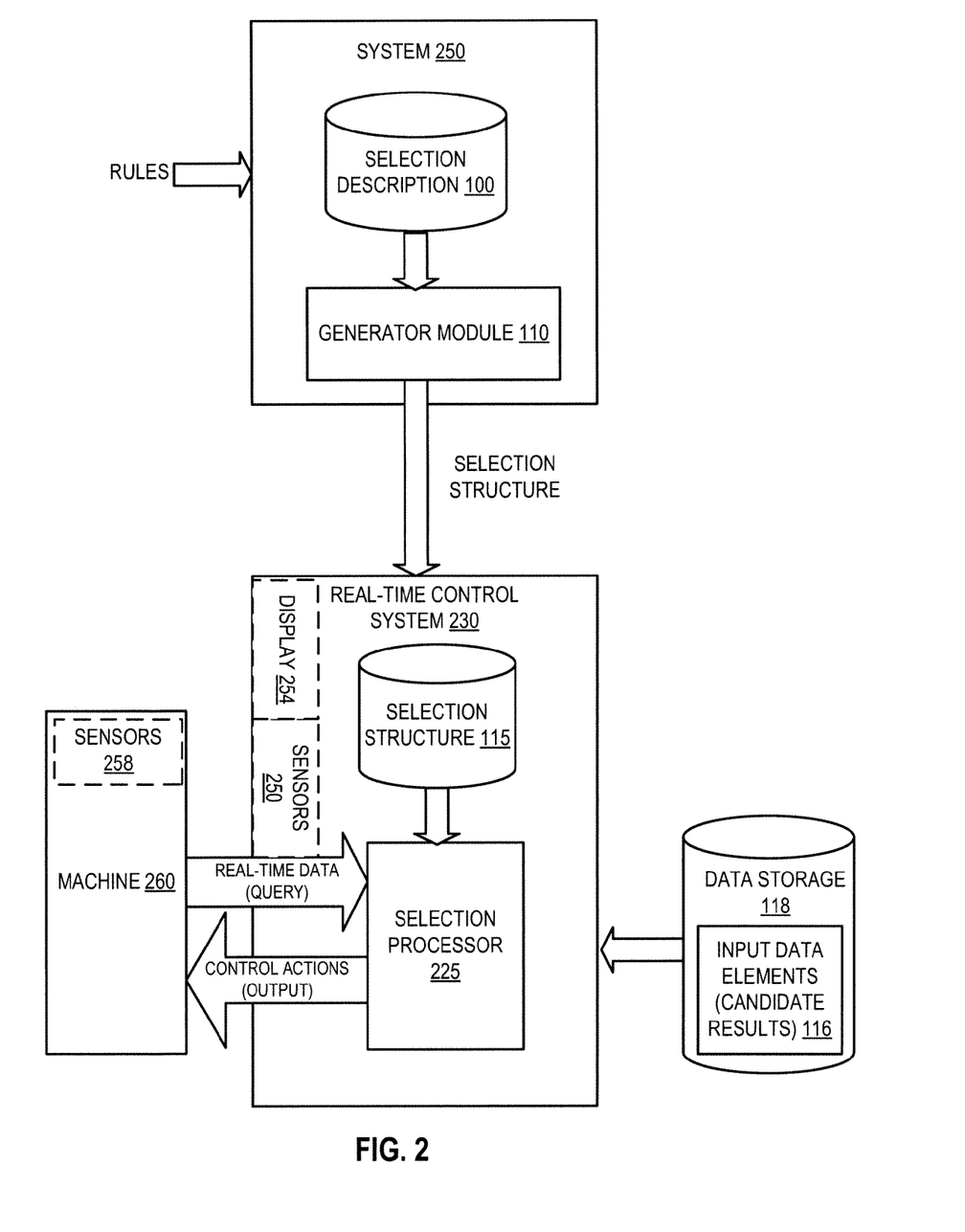
FIG. 2 illustrates an alternative environment in which an embodiment of the invention may operate.

FIG. 2 illustrates an alternative embodiment in which the generator module 110 and the selection module 125 are in different systems. In this embodiment, the selection structure 115 is generated by the generator module 110 before the selection function is performed. The generator module 110 can operate offline and the selection module 125 can operate online. Operating offline means that the generator module 110 does not need to be active during the selections. In one embodiment, the generator module 110 can be used independently of the selection module 125; e.g., a new or updated selection structure 115 can be generated during the processing of selections. In one embodiment, a real-time control system 230 including the selection module 125 is coupled to a machine 260. The real-time control system 230 and/or the machine 260 may include sensors 250, 258, or other real-time measuring devices for making real-time measurements of the machine operation or of its environment. Based on the rules described in the selection structure 115 and the real-time measurements (e.g., sensor data) from the machine 260, the selection module 125 selects an output from the input data elements 116. The output may be a control action signal that controls the operation of the machine 260. In one embodiment, the real-time control system 230 may also include a display 254 for monitoring machine operation and for displaying which of the rules in the selection structure 115 make a positive contribution to the output (i.e., the control actions). The displayed data may be shown in table, graphics, or other formats.

In the examples of FIG. 1 and FIG. 2, two actions are described in connection with evaluating a selection description. One action is performed by the generator module 110 to generate the selection structure 115. The other action is performed by the selection module 125 that uses the selection structure 115 to make a selection. The selection is made, in response to a query specifying a set of conditions, from a set of input data elements that are the candidate results. The selection is guided by the selection structure 115 and the weights of the rules that form the selection structure 115.

Arguments and possible results can be addressed using a specific set of predicates. In this case, a predicate denotes a property. For an argument, its profile is stipulated by those predicates that the argument satisfies and those predicates that the argument does not satisfy. For a result, its profile is stipulated by those predicates that the result satisfies and those predicates that the result does not satisfy.

A selection description (e.g., the selection description 100 of FIG. 1) contains a set of rules. A rule can be described in the following form: <argument predicate>→<result predicate> (weight) [1].

In this case, <argument predicate> is a Boolean expression representing a condition, <result predicate> is a Boolean expression representing a conclusion, <weight> is a numerical value. If the expression <argument predicate> is satisfied for an argument, the result objects denoted by <result predicate> are weighted with <weight>. Other rule formats may also be used.

Rules can be linked by means of additive accumulation. If multiple rules apply to an argument, then the weights of these rules are added up. The selection is dependent on the resultant weighting. One selection approach is to maximize the resultant weighting. A result profile (i.e., the subset of candidate results) with the maximum resultant weighting is to be selected. Accumulation operators other than additions may also be applied.

In one embodiment, the generator module 110 generates the selection structure 115 in the form of BDDs (Binary Decision Diagrams) and/or ADDs (Algebraic Decision Diagrams). Presentation formats other than BDDs and ADDs can also be used. The ADDs are also known as MTBDD, standing for "Multi-Terminal Binary Decision Diagrams". These data structures are described in I. Bahar, E. Frohm, C. Gaona, G. Hachtel, E. Macii, A. Padro, F. Somenzi: "Algebraic Decision Diagrams and their Applications", Journal of Formal Methods of Systems Design, Vol. 10, No 2/3, pp. 171-206, 1997. Existing tools for manipulating ADDs include the CUDD package (Colorado University Decision Diagram Package), which has been developed and is being developed further under the supervision of Fabio Somenzi at the Colorado State University. In another embodiment, other programs can be used. ADDs have been used in matrix computation, shortest-path computation, and logic synthesis, verification and testing. However, the prior work has not or has not been able to construct an ADD for a real-time system that makes selection decisions for real-world problems in real time. Embodiments of the invention describe an optimized ADD construction technique that includes: parallel and serial linking, cumulation, approximation, reduction and incremental updates, such that a series of binary decisions can be quickly made in real time in response to a query to obtain an output. This decision process is applicable in many areas of real-time systems as will be described below.

In one embodiment, the left side of a rule is a Boolean expression which can be presented as a BDD. The right side of the rule can be one or more Boolean expressions of binary coded results. The full right side can be presented as a BDD using result coding bits. A conjunctive link of the two sides produces a BDD which describes the combinations of arguments and results for which the rule determines a weight. The weights can be any numerical numbers, including positive number, negative numbers and zeros. For example, one can eliminate the effect of a rule from a selection structure by adding the rule after negating its weight. By multiplying the initial weights of terminal nodes (which are 0 or 1) with the weight of the rule, an ADD is produced which expresses this weight association. The generator module 110 adds the ADDs for all of the rules to produce a cumulated result, which has the desired cumulated weight association. For the described object of maximum association, the generator module 110 extracts from the ADD a structure containing a number of (one, a few, or all, according to application requirements) candidate results with a maximum weighting for each argument profile. The extracted structure is a selection structure. In another embodiment, the selection structure also contains result profiles with lower than maximum weighting. In some embodiments, this influences the need for database queries. If database queries are necessary from time to time, then buffer storage of request results can be used to reduce the number of requests.

In the embodiment where ADDs are used as the selection structure, the selection structure is a directional, acyclic diagram with a degree of branching of two in which the argument predicates appear in a fixed order on every path. Similarly, in the embodiment where BDDs are used as the selection structure, the selection structure is a directional, acyclic diagram with a degree of branching of two in which the argument predicates appear in a fixed order on every path. When a generalized ADD is used as the selection structure, the degree of branching can vary from one internal node to another internal node. At the end of every path is a result or a reference to the result. Since a predicate occurs a maximum of once on each path, a request can be answered in linear time in the number of argument predicates, regardless of the number of rules. The following description uses ADD as an example for the selection structure; however, it is to be appreciated that the use of ADD is exemplary and other embodiments (e.g., BDD or generalized ADD) may also be used as a selection structure.

In one embodiment, the generator module 110 can produce additional structures for logging purposes. In another embodiment, the generator module 110 can extend the selection structure 115 with additional information, including which rules have acted for an argument and which contributed to the decision. The frequency of these results can be logged. In one embodiment, the selection module 125 can provide information about the success of a selection decision. This information can be utilized to calculate back to the responsible parts of the selection description 100. In another embodiment, the weights for the successful selection decision are calculated. Logging may require additional processing time, which is dependent on the accuracy of the chosen observations and, for some observations, on the number of rules. Hence, in some embodiments, logging can be activated and de-activated dynamically based on the load on the system.

The selection module 125 makes decisions regarding which actions need to be performed. This can be done even if the actions have numerical parameters. In one implementation option, such parameters are denoted discretely. Discrete ranges of parameters can generally be obtained by employing clustering techniques. In a decision diagram such as a BDD or ADD, numerical values and elements that contain numerical values can be regarded as discrete values. Operations of discrete functions can be numerically intensive. One way of introducing discrete profiles for functions which involve numerical values is to describe numerical values using properties or to represent them on an approximate basis using elements of discrete value ranges. Another way is to represent numerical values using algebraic terms.

In one embodiment, an initial stage module operates on the input to the generator module 110 to transform or approximate the arguments of the rules into a discrete form. In response to query input that specifies discrete arguments, the selection module 125 makes selection decisions to generate a control output which are forwarded to a controlled system. An embodiment option (the "a priori discretization") evaluates numerical conditions in the initial stage module to perform discretization and numerical calculations at that time. An alternative embodiment option (the "a posteriori discretization") performs discretization and numerical calculations in an output stage module that operates on the output of the generator module 110. Depending on the application areas, some embodiments may operate without the initial stage module and/or output stage module.

In the scenario of a priori discretization, discretization of a numerical range is performed before the rules are given. Each numerical range is discretized separately. For example, the machine rotation values may range from 0 to 60 KHz, which may be discretized into 20 intervals of significance. Some values may not have an upper or lower bound and some values may need finer or coarser resolutions. The predicates can be formulated within the finitely discretized ranges. The number of predicates can be very large, causing the size of the ADD to be unmanageable.

The advantage of a priori discretization is that it is done once and holds for all rules that one needs to write in the future. However, the size of the ADD needs to be managed well. In particular, if one wants to consider multiple (e.g., 10) time slices of historic sensor values to observe the development of these values and react to the tendencies, the number of predicates is multiplied by 10, which in turn adds to the complexity and size of the problem.

In the scenario of a posteriori discretization, discretization of the ranges is performed after the rules are given. Because one constructs the discretization from the predicates actually appearing in the given rule set, this leads to much smaller sets and therefore scales much better. The ADD is constructed using the discretized ranges in the rules. Thus, the a posteriori discretization discretizes based on need to avoid unnecessary complexity. However, with the a posteriori discretization, adding a rule may cause changes in the set of predicates. If the rule set is not changed often (e.g., in the case of a control system that controls the machine vibration), the a posteriori discretization may be preferred over the a priori discretization.

In general, the embodiments described herein are suitable for describing and evaluating rules whose arguments can be described by argument profiles and whose results can be described by result profiles. When the argument profiles are discrete values, the result profiles are discrete values. The conversion from an argument to an argument profile and the conversion from a result profile to a result can be performed by embodiments of the invention.

In one embodiment, the argument and the argument profile can be identical. There is no conversion from an argument to an argument profile. In one embodiment, the result profile and the result can be identical. There is then no conversion from a result profile to a result.

In one embodiment, the selection description 100 describes the rules which assign result profiles to argument profiles. A query includes an argument profile. The result profile assigned to the argument profile specified by the query is the output. The entire collection of candidate result profiles are the profiles of the input data elements 116. These input data elements 116 can be available in explicitly enumerated form, but can also be implicitly defined as a set of data elements, such as bit arrays of a fixed length which represent integers.

Various forms of functions performed by the system 150 and the real-time system 130 include: 1) Assignments: each element in a set of objects needs to be assigned an object from a further set, 2) Weighting: on the basis of argument, objects in a set need to be weighted, and 3) Selections: on the basis of argument, objects need to be selected from a set.

Personalization, e.g. customer-specific compilation and/or modification of a web presentation, can be regarded as assignment. Functions in different application areas can be likewise covered by these generic terms. These include, by way of example, rule systems for technical processes. For example, an engine rule system in a car (e.g., as part of the popular Electronic Stability Control System) needs to perform control operations on the basis of user actions and the state of the drive components. The decision as to which actions need to be prompted depends on discrete observations, and the actions themselves need to be selected from a discrete set. Execution of the actions themselves can involve calculations on continuous values.

In specific terms, such functions can have a variety of purposes. For example, when there are available spaces in a web page for banner advertisements, banners can be selected from an available set at the display time. This selection can be based, in particular, on a weighting which assigns numerical values to the various banners based on the situation. As an example, a banner with the maximum weight can be selected. Weighting can also be used when risk assessment is based on the factors known about a situation. By way of example, a system can decide about the acceptance of a credit card for a financial transaction using a weighted decision diagram, such as the ADD as described herein.

A rule can be used to relate a query to a collection of result profiles. The use of a numerical component such as weighting allows the strength of such a relationship to be expressed. Weighting for a query can be expressed by a numerical component, as can weighting for a result profile. A binary-value condition part for a query and a binary-value conclusion part for input data elements in a rule can be used to denote the set of the pairs of a query input and result profiles to which the respective conditions apply.

Individual rules can be linked to form a selection description, based on which a selection structure (e.g., an ADD, generalized ADD or BDD) can be formed. Notable types of links are as follows:

1) The cumulation, where for each pair of query input and a result profile the numerical components of those rules which denote this pair using a condition part and a conclusion part are linked. Hence, the expressed strength of the relationship of the pair of components is cumulated. Cumulation is the combination of a plurality of numerical weighting functions to form a single one, with the overall weighting being obtained in every single case through the application of an associative and communicative link to the set of individual weightings. Cumulation can be performed using any arithmetic operator, one specific form of which being the addition.

2) The prioritization, which allows an expression of which rule is to apply when more than one can be used. In one embodiment, the prioritization can be formulated using numerical rule components. An example of prioritization is to assign a higher priority to a rule that calls for a smaller adjustment in machine operation (e.g., release pressure by 1%) and a lower priority to a rule that calls for a bigger adjustment (e.g., release pressure by 2%). As another example in the area of personalized advertisement, a higher priority may be assigned to a rule that is related to age and a lower priority may be assigned to a rule that is related to gender. One simple form of prioritization is to take the rule with the highest priority among the applicable ones, and no cumulation of weights is required at all.

3) The serial connection, where results of an upstream part of the rules in ADD evaluations deliver or modify arguments for a downstream part of the rules in the ADD. In one embodiment, actions resulting from upstream rules are executed before the downstream rules are applied.

In addition, there can be other links between rules. The links can be applied to individual rules and to sets of rules and to rules which have already been linked. Rules which occur in a selection description do not all have to relate to the respective same types of objects in condition parts and the same types of objects in conclusion parts.

In one embodiment, the selection description describes selections of a result profile which includes more than one component. The selections are described in at least two parts, which are connected in succession. In an upstream part, the weighting of the result profiles for the individual components is described using cumulatively linked rules. In a downstream part, the weighting of the upstream result profiles is used to evaluate or modify the downstream rules. Selection descriptions corresponding to this form are suitable for a wide variety of applications. For example, selections for missing components in web pages can be formulated in this manner. In one embodiment, data elements for all the individual components of the output are weighted with cumulation by means of addition in upstream parts. A downstream part takes into account interdependencies between the individual components, for example, the avoidance of conflicts.

The inclusion of elements in the rules which refer to previous selections makes description selections possible, so that the results of later selections can be matched to the results of earlier ones. One approach involves the avoidance of conflicts; i.e., the results of different selections should not contradict with one another. Another approach involves complementing the earlier results with the current selection. One example of an application is the description of a selection of advertising components, so that a succession of advertising components appear on successively retrieved web pages which are consequently presented to the caller in order.

Macros are description data elements which denote partial data elements of a selection description. The occurrence of a macro in a selection description represents the denoted partial data element. One benefit of the use of macros is that a selection description in many cases is represented in a shorter form than when macros are not used. Another benefit is that a selection description can be represented more clearly by using macros. One specific form of macros denotes a selection description. Macros can be designed such that a macro occurs in multiple selection descriptions.

A selection description can be specified such that parts of the rules apply for more than one rule without new occurrences of the rule parts being present in the selection description for each of the rules for which the rules apply. One form of such multiple applicability is that, with a plurality of rules where a part describing a query is common to these rules, this part appears only once in the selection description, and the description of the individual rules to which this part is common is respectively completed by specifying the addition. In another form, a part with multiple applicability can be used if descriptions of result profiles are the same in a plurality of rules.

Figure 3:
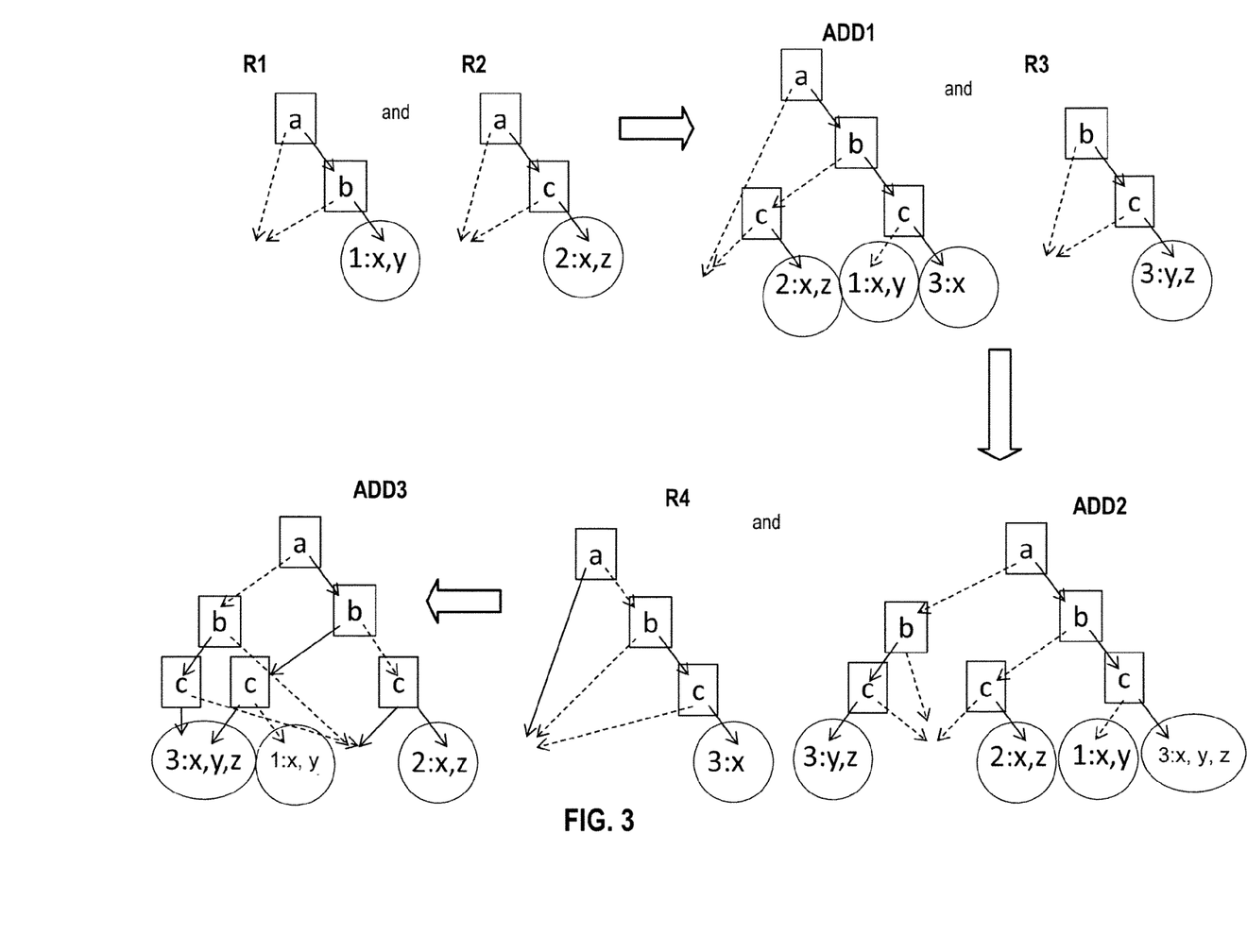
FIG. 3 illustrates an example of constructing an Algebraic Decision Diagram (ADD) according to one embodiment.

FIG. 3 illustrates an example process of constructing an ADD by linking multiple weighted rules. It is to be appreciated that this example is illustrative but not limiting. In this example, a, b and c represent Boolean properties, x, y and z represent output, and w represents a weight. R1-R4 represent rules. R1 represents: if a and b then x and y are associated with weight 1; R2 represents: if a and c then x and z are associated with weight 2. Each square box represents an internal node at which a binary decision (true or false) of a condition is made. The solid line leads to a result when the condition is true. The dotted line leads to a result when the condition is false. The circles represent terminal node, and each terminal node represents a subset of candidate results. The combination of R1 and R2 forms ADD1, which has three possible outputs: x and y associated with weight 1; x and z associated with weight 2; and x associated with weight 3. ADD1 can be further combined with R3 to form ADD2, where R3 represents: if b and c then y and z are associated with weight 3. ADD2 can be further combined with R4 to form ADD3, where R4 represents: if (!a) and b and c then x is associated with weight 3. As can be seen from FIG. 3, ADD is a tree-like structure where each internal node has two children, representing the results of a true condition and a false condition, respectively.

When the order of variables (e.g., a, b, c) is determined, an ADD can be constructed to concisely describe a collection of decisions with each candidate result (e.g., a control action such as x, y, z) and its accumulated weight. During the selection processing, the ADD can be traversed from top to bottom to produce a selection output. The Boolean properties of the internal nodes of the ADD are examined from top to down along the edges of the ADD. If the property is true, the solid edge is followed, otherwise the dotted edge is used until a terminal node is reached.

The term "decision diagram" herein is also referred to as an association diagram. An association diagram is a finite diagram for assigning output elements to input elements with two types of nodes, internal nodes and terminating nodes. The internal nodes are the starting point for edges directed to other nodes. The edges have associated properties of the input elements. The terminating nodes denote sets of output elements. Each internal node describes a condition, which is a Boolean function that assigns an input element to those output elements denoted by those terminating nodes which can be reached via paths, where the input element has all the properties which are associated with the edges on the path. A selection decision can be made using the association diagrams with minimized binary degree of branching, and using routines and tools for processing the association diagrams.

Binary degree of branching means that there are two edges coming from an internal node in the diagram. In an embodiment where a generalized ADD is used as the selection structure, the internal node may describe an n-ary decision function where n may vary from one internal node to another.

An association diagram conglomerate contains an association diagram or a set of association diagrams which are linked to one another, where parallel connections and serial connections belong to the usable link types can both be used within the conglomerate. In the case of an association diagram link of a parallel-connection type, the output elements of the linked association diagram can be produced together from the output elements of the individual diagrams by means of an element link. The links of the parallel-connection type include the parallel placement of the output elements of the linked association diagrams in a tuple, the association diagrams being applied to the same input element in each case. In the case of an association diagram link of a serial-connection type, output elements of upstream diagrams go into the input elements of downstream diagrams. Association diagram conglomerates contained in the selection structure data element can be quickly evaluated when the argument profile from the query data element is available.

Association diagrams can be minimized by combining or merging nodes that describe the same function or similar candidate results. Association diagrams and association diagram conglomerates describe functions. The description of a function is approximative if the description describes the same selection for an overwhelming majority of the query inputs, except for a small number of times it does not describe the same selection. Alternatively, a description is approximative if the association is based on a numerical weighting and the association described chooses those output data elements whose weighting differs by little in the overwhelming majority of cases. An association diagram can sometimes include millions or more nodes, each of which is a decision point. The approximation mechanism described herein can significantly reduce the size of the diagram and allows the diagram to be traversed in real time for making a selection.

Figure 4A:
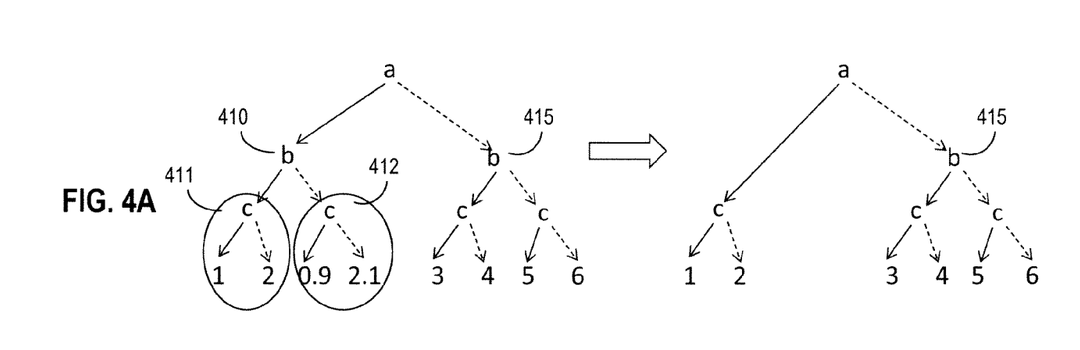
FIGS. 4A-4C illustrate examples of applying an approximation to an ADD according to one embodiment.
Figure 4B:
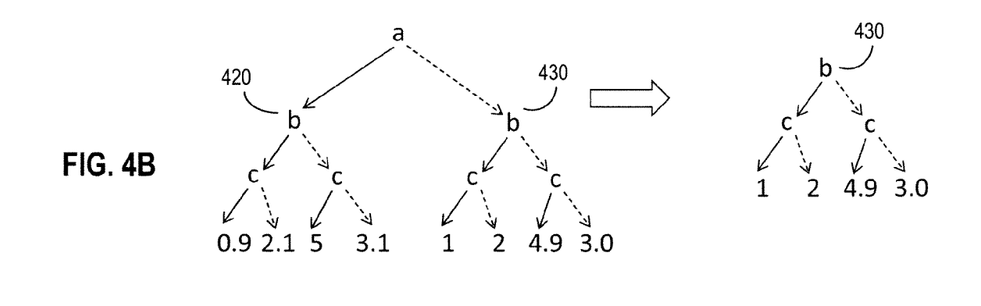
Figure 4C:
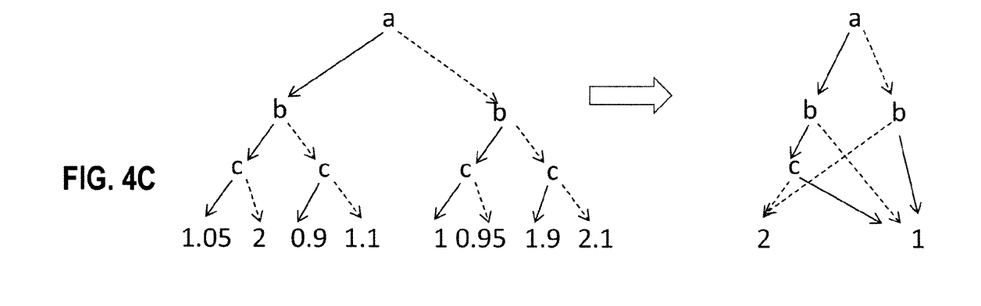

FIGS. 4A-4C show three examples of optimizing an ADD by approximation. The approximation reduces the size of the diagram and therefore reduces the time it takes to traverse the diagram for making a selection. In these example, an approximation mechanism referred to as the "90% rule" is applied. The 90% rule applies when the accumulated weights of a set of terminal nodes are within the 90% percent range of the average of the accumulated weights. It is understood that an approximation rule of any suitable percentage for a particular application area and scenario can be used. The percentage may be specified by a controller that controls the generation and optimization of the selection structure. The diagram of FIG. 4A includes a left-side b 410 and a right-side b 415. The two subtrees (411 and 412) of b 410 are within the 90% range and therefore can be collapsed (i.e., merged), making b 410 redundant. Two subtrees 411 and 412 are within the 90% range when their respective terminal nodes have weights that are within 90% range. Thus, only one subtree (e.g., subtree 411) needs to be preserved. The other subtree (e.g., subtree 412) and b 410 can be removed. The diagram of FIG. 4B includes a left-side b 420 and a right-side b 430. The subtree starting with b 420 and the subtree starting with b 430 are within the 90% range and can be collapsed, making a redundant. FIG. 4C shows another scenario where multiple nodes can be combined according to the 90% rule. The result is a more concise diagram on the right.

In some embodiments, the size of the diagram can be reduced by merging terminal nodes that are within a specific range of a given metric, such as closeness of weights or closeness of associated semantics. When (two or more) terminal nodes are merged, a new "aggregate" node is formed from the (two or more) merged nodes (the "constituent" nodes). In case of closeness of weight, the aggregate node may take the original weight of any of its constituents, or be given an aggregated weight such as the average weight of the constituent nodes. In some embodiments, if the actions/candidate results of some terminal nodes are substantially the same (i.e., they are very close in their semantics), then these nodes may also be merged. In this case the weights of the collapsed nodes are cumulated (e.g. added). An example is in the context of discretization of continuous values. A coarser discretization may lead to more merging and to higher weights, as the rules applicable to any of the constituent nodes are now valid for the aggregated node and therefore contribute to the weight of the aggregated node.

An extension to the generator (e.g., the generator module 110 of FIG. 1) can produce a reduced selection structure which is even smaller than those which describe the function approximately. The reduction can be controlled by control input elements. Methods which can be used for the reduction and approximation include combining nodes in the association diagrams which do not describe the same function, rounding of weightings, limitation of the accuracy for representing weighting functions, reduction of the result space of functions, reduction of the result space of parts of functions, and the like.

Embodiments described herein provide a method of approximation through calculation for cumulative numerical weighting functions with accuracy controlled by control input elements. Reducing the selection structure allows the generator module 110 and the selection module 125 to be implemented less expensively, any apparatus connecting to the generator and selection modules 110, 125 to be implemented more beneficially or operated less expensively, and the processing speed of the generator and selection modules 110, 125 to be increased.

Embodiments described herein are capable of approximation for selection description which describe serial connection of functions, by virtue of the results of the upstream stage in a serial connection being approximated. One form of this approximation relates to cases where the upstream stage is at least partly based on weighting, and the weightings for the first stage do not go into the input data elements of the downstream stage for all input data elements which are to be weighted. In one embodiment, a selection of the weighted input data elements which go into the downstream stage is made such that a prescribed number is selected which is characterized in that data elements with high weightings are given priority over those with lower weightings and the profiles of the data elements in the selection differ in many values.

A selection structure can be incrementally updated from an original selection structure based on an updated selection description. For example, after an original selection structure has been generated from a selection description, a change in the selection description can involve generation of an updated selection structure which corresponds to the change without carrying out all of the actions that would be necessary for regeneration. In this context, the update process proceeds with stored association diagram conglomerates that are derived from the original selection structure, and modifies them concurrently with the change, in order to subsequently to derive the updated selection structure therefrom. In one embodiment, when the change in the selection description relates to rules linked by cumulation, a change can be incorporated by cumulating differential rules.

Some embodiments have access to at least two selection structures. In operation, a selection structure can be replaced without interrupting operation. The selection module 125 can choose which selection structure to access, and change over to a new selection structure without interrupting ongoing operations.

Embodiments described herein can be controlled such that interim results from a selection operation are available for a later selection operation. This reduces the time required for a later selection operation.

Embodiments described herein can be influenced by control inputs such that the same selection is not always made when the query data element and the selection structure data element are the same, but rather different selections are made on a random basis. In one embodiment, the degree of the selection variation can be controlled; e.g., by applying the rules to a query input in a fixed order. In another embodiment, if the selection is based on a weighting, the likelihood of an output data element being selected increases with its weighting.

Embodiments described herein permit the results of the selection to be altered without changing the selection structure. In one embodiment, this is done by virtue of the selection structure not containing the output data elements but rather only descriptor data elements. The output data elements are associated with the descriptors in a further data element, which can be altered.

Embodiments described herein perform actions during a selection which relates to data elements apart from the selection structure. In one embodiment, these actions are denoted by interim results during the selection. In one embodiment, these actions alter the query input. In one embodiment, the performance of an action includes access to a data store from which data elements are taken which are used to alter the query input. In one embodiment, alteration of a query includes complementing the query data elements.

Embodiments described herein comprise an apparatus which converts output data elements into corresponding real-time actions. In one embodiment, an action includes the sending of a message. In another embodiment, an action includes the activity of a physical actuator. In one more specific embodiment, a physical actuator is an apparatus which performs movements.

Embodiments described herein are contained in a control apparatus for a physical or chemical process. The process may be purely physical, monitored, and/or controlled. For a selection, the query contains a description of the state of the process which is to be controlled. The selection description contains a description of an action by the control apparatus. In one embodiment, the selection is made cyclically.

Embodiments described herein are used to calculate a weighting function. The output data element calculated for a query denotes the weighting of the argument denoted by the query. In one embodiment, the output data element comprises numerical components. Embodiments described herein ascertain weightings for the query. In one embodiment, a numerical weighting is selected. In another embodiment, one stage from a set of classifications is selected.

In one embodiment, there is no database access operation during the selection process. In one embodiment, the database access operations are performed when the selection structure is created. In another embodiment, database access operations can be performed while the selection module is active, in which case the results of database access operations influence further selections. In one embodiment, each database access operation is performed at most once, because results of database access operations are stored in a buffer storage for reuse.

Embodiments described herein are used for identifying the effect of each of a set of rules when a selection description is created. A rule makes a positive contribution to a selection if its condition part is satisfied. With a rule where the condition part describes a set of query data elements, this means that the available query data elements belong to the described set of query data elements. In one embodiment, a system displays the analysis data element as a table. In another embodiment, a system displays the analysis data element as a diagram. In one embodiment, a plurality of display types can be chosen. The system may produce analysis data elements which also contain frequencies for satisfaction of the analysis details.

Embodiments described herein are also used for ascertaining the effect of the selection function in addition to making the selection. To this end, a protocol data element can be created which specifies the frequency of selections of output that are made in succession. In one embodiment, the protocol data element logs rules which make a positive contribution. In one embodiment, the protocol data element logs rules without whose presence another selection would have been made. The protocol data element can be displayed. In one embodiment, the display is graphical. In one embodiment, the display is in table form. In one embodiment, a plurality of display types can be chosen.

Embodiments described herein can be operated by various systems and devices, which means that information is not accessible to all operators to the same degree. For example, operators of selection modules are provided with a selection structure, but may not be provided with the selection description. In one embodiment, the operators of selection description devices are not provided with the input data elements. In one embodiment, the selection description is created on the basis of profile components of the input data elements. In another embodiment, a description of the set of input data elements is available in the form of a categorization.

A number of application areas for the ADD techniques are described below according to embodiments of the invention. These operations performed by the embodiments described below may be performed by the systems of FIG. 1 and FIG. 2, or variations thereof. In the embodiments described below, one or more of the systems 150, 130, 180, 250 and 230 may be a control system, a web server system, a personalized search system, a personalized data management system, an embedded system, or other types of systems suitable for the individual application areas.

Description of an Embodiment

Embodiments described herein can be used in various areas. For example, one embodiment of the ADD technique can be used for a control system to cancel machine vibrations through control adaption in real time. In one embodiment, the control system may include laser-based vibration sensors, which detect machine vibrations. The sensors collect data in real time during machine operation. The collected data is stored with time stamps to allow tracking of the stepwise development of machine operation. A control action is generated based on the collected sensor data.

In one embodiment, the collected sensor data is aggregated. A propositional language is defined for expressing the sensor data and the control action. A set of aggregation rules are developed. For example, "IF" refers to conditions of time stamps and sensor measurements, and "THEN" proposes control data for steering the machine. Each rule is assigned a weight to indicate its strength. This rules system is the language of vibration.

The sensor data is interpreted in real time. A selection structure in the form of an association diagram is generated. As mentioned above, this selection structure is an ADD formed by linking multiple weighted rules. To prevent the size of the structure from growing too fast, optimization techniques are applied such as approximation, reduction, and the like, as described before.

A control system coupled to the machine can execute control commands to steer the machine operation. Using the selection structure that is generated according to embodiments of the invention, the commands may be executed in real time at a frequency of 10 Hz, 100 Hz, 1 KHz, 10 KHz or above.

Further sensor data may be collected to validate the machine feedback. By evaluating these sensor data, the control system can observe success or failure of the machine control and then further adjust the control output.

FIG. 5 is an example of a set of rules that can be used as a selection description for a vibration control system. For simplicity, only five rules are shown. It is understood that in a real-world control system, tens or hundreds of rules may be used. Each rule in this example has a condition part (i.e., the condition indicated by the IF clause), a conclusion part (i.e., the result indicated by the THEN clause), and a weight. A selection structure in the form of an ADD can be constructed using the technique described above in connection with FIG. 3.

Assume that the query is: (VibrationAmplitude=9.5 micrometers) and (VibrationDirection=65 degrees) and (VibrationFrequency=6 KHz) and (PressureOfTool=100 p) and (RotationOfTool=40K per minute). The control system traverses the selection structure following the edges of the diagram that satisfy the queried conditions to make a selection. The selection is made from a set of input data elements to generate an output. In this example, the set of input elements include all of the candidate results listed in the rules, which are: DecreaseRotation by 2000 per minute, IncreaseRotation by 2000 per minute, IncreaseRotation by 4000 per minute, IncreaseRotation by 6000 per minute, ReleasePressure by 2% in direction –65 degrees, and ReleasePressure by 4% in direction –65 degrees. By accumulating the weights of the rules that a queried condition satisfies, the following is the weight of each candidate result:

DecreaseRotation by 2000 per minute: w=15;
IncreaseRotation by 2000 per minute: w=4+4+2=10;
IncreaseRotation by 4000 per minute: w=4+4+2=10;
IncreaseRotation by 6000 per minute: w=4+4+2=10;
ReleasePressure by 2% in direction –65 degrees: w=4+15+2=21; and
ReleasePressure by 4% in direction –65 degrees: w=15+2=17.

The output is a set of candidate results that have the highest weights and satisfy the conditions specified by the query. Also, the candidate results in this set do not conflict with each other. Thus, the output in this example is DecreaseRotation by 2000 per minute and ReleasePressure by 2% in direction –65 degrees. Using the ADD to determine the output can be very efficient. If there are 100-1000 possible input data categories, responding to a query at runtime consists of traversing the ADD to make at most 1000 simple Boolean decisions. These Boolean decisions can be done in less than a microseconds or less. In comparison, a logical evaluation might take days.

Description of Another Embodiment

Computer components which perform functions within other devices are referred to as embedded systems. An example of a function which can be performed by an embedded system is control of the ignition time in the engine of a car. Another example is the control in an analog or digital camera. Another example is the control unit in a mobile telephone. Embedded systems frequently need to satisfy real-time requirements while resources are simultaneously scarce, partly for economic reasons and partly for technical reasons. Thus, embodiments of the invention can be used advantageously in this area when the necessary scope of function can be implemented in the manner described.

In one embodiment, the embedded system contains the selection module 125 of FIG. 1 or FIG. 2. In one embodiment, the selection module 125 is implemented on an information-processing chip. In another embodiment, the selection module 125 can be added to the rest of the embedded system in a modular fashion. In specific instances, the selection module 125 is the control unit in the embedded system. In an even more specific instance, the embedded system includes a selection module 125 with the selection structure 115 and is connected to peripheral devices for making the inputs available and for activating the outputs.

The selection structure 115 can be stored on the same chip as the selection module 125. Alternately, the selection structure 115 can be implemented on a separate chip. In one specific embodiment, the selection structure 115 can be altered. In another embodiment, the selection structure 115 can be implemented on replaceable storage media. In another embodiment, the selection structure 115 is loaded on a static memory.

One fundamental application type relates to selections from a set of data objects which are stored in databases. In this case, the preparation allows time consuming database queries at the selection time to be avoided completely or to be reduced to one or a few. This means that corresponding applications can be implemented without expensive database servers or without database servers at all. One specific application context of the invention is personalizing web presentations and that, of personalizing e-commerce systems. In this case, the speed of evaluation is revealed to particular benefit, since servers need to process user queries in real time and can be designed to greater benefit using the invention.

Description of Another Embodiment

One example is dynamic compilation of the content of web pages. Dynamic compilation of contents of web pages means that various calls to a web page do not always result in display of the same content. The compilation can be personalized, e.g. customer-specific compilation and/or modification of a web presentation.

The compilation can be described by a selection description. In one embodiment, a query contains information about the calling entity. In another embodiment, the query contains information about circumstances of the system (e.g., a web server) which is compiling the web page. The output data element determines the content of the web page. The content of a web page comprises structure information which is written in a language such as HyperText Markup Language (HTML). In one embodiment, structure information for the web page is dependent on the output data element. A web page can contain presentation information. One example of presentation information is color. In one specific form, presentation information is dependent on the output data element. A web page can contain text. In one embodiment, text on the web page is dependent on the output data element.

A web page may incorporate externally available components. One example of externally available components are diagrams. In some embodiments, the selection of externally available components is dependent on the output data element.

Some aspects of the systems, methods and apparatus described herein are used to personalize e-commerce systems. In one embodiment, the dynamic compilation of web pages contains a selection of offers matched to the customers. In one embodiment, the dynamic compilation of web pages comprises a selection of offers which are influenced by the operator page of the e-commerce system. One example of offers influenced by an operator page are special offers. Another example is seasonal offers.

Embodiments of the invention enable web pages with personalized advertisement. Such web pages typically have specific slots where products can be advertised. These slots can be filled in a prioritized fashion. The advertised objects may be products, but also sites, shops, or other places, whose weight is given, e.g., by proximity. Moreover, there may by weighted rules depending on a customer's previous actions: if the customer bought something earlier, then some related products may be assigned high priority and are offered (e.g., add-on selling).

The design of a web page can be automatically adjusted or personalized (e.g., in terms of color, shapes, objects, etc.) according to embodiments described herein. This adjustment or personalization can be performed as a series of Boolean decisions using an ADD. There are a number of possibilities for adjusting web pages. For example, the webpage of a person's bank account can be assigned a color that reflects the person's current balance. The ADD-based selection mechanism enables multi-criteria selection, which is readily applicable to tailored campaign management as part of electronic marketing. Offers can be made on the basis of numerous indicators, e.g., personal profile and current situation (e.g., time, weather, the goal of a campaign, etc.), by adding the weights of applicable rules (rules where a pre-condition is satisfied). Mathematical operations may other than addition can also be applied.

Description of Another Embodiment

In targeted marketing, the aim is to select potential customers who are then addressed with greater prospects of success than in the case of randomly scattered advertisements. A prerequisite is always a database storing information about customers. The invention can be used advantageously in this area in different variants.

First, the rule formats provide description means that can be used to formulate associations and weightings between customers and products. One particular benefit in this context is that the rule format can also be used by marketing specialists who have no special knowledge about databases. The rule analysis options are also useful in this connection.

A technical benefit is also that rules which assign products or product weightings to customers or customer profiles can be interpreted in the opposite direction. By way of example, the selection structures can also be in a form such that products or product profiles are assigned to customers. Utilizing this selection option can simplify the creation of the descriptions. Any desired intermeshing of customer and product profiles can also be used in the descriptions. Another benefit is obtained when an existing, e.g. for some time tried-and-tested rule set which recommended products to customers (that is to say was used for product selection) can now be used, possibly having been extended, for selecting customers.

The use of the selection structure and selection apparatus also accounts for data protection aspects and the protection of proprietary knowledge in a very extensive form. Thus, to create the selection structure and selection apparatus, knowing the specific data records is not necessary without impairing the process. Structure and evaluator can also be created entirely without access to the database. Thus, undisclosed data can be used for targeted marketing. In one embodiment, a user creates a rule set and produces an evaluator and a selection structure therefrom. The system which has the database undertakes extraction of the data records and sending of the advertisement. The data records themselves thus remain secret. Additionally, the user can also keep rule set secret, since the rule set cannot be created again from the selection structure. Even in other forms of the system, information having a lateral or unilateral protection is features which are also relevant to applications.

Some aspects of the systems, methods and apparatus described herein can be used for targeted advertisement. The use of the apparatus protects data from the parties involved. Input data elements identify target units for the advertisement. In one embodiment, these are addresses. Query data elements describe the advertisement contents. In this embodiment, the advertisement contents are products. In another specific form, the advertisement contents are offers or lists of offers. In another embodiment, the advertisement contents are brochures. The operator of the selection device has the input data elements available. The party initiating the advertisement creates the selection description without any knowledge of the contents of the input data elements. The operator of the selection device uses the selection structure data element to ascertain the selected input data elements. In one embodiment, the operator of the selection device is not provided with the selection description. In one embodiment, the operator of the selection device undertakes to carry out the advertisement. In another embodiment, the party initiating the advertisement is provided with identifications for the selected input data elements, which the party can use to carry out the advertisement. In one embodiment, the party initiating the advertisement stipulates the selection structure by using an available selection structure which assigns advertisement contents to advertisement target descriptions. One embodiment of the selection description apparatus converts the available selection structure such that the apparatus assigns advertisement target descriptions to advertisement contents.

Description of Another Embodiment

Embodiments of the invention provide a personalized database manager that performs personalized searches in a database. The ADD-based selection mechanism allows a requester to receive prioritized and ordered returned data when querying a database or the Web (via a search engine) according to a requester's profile. A standard mechanism can be used for the database access or the web search. The set of data returned by the standard mechanism are analyzed in order to associate a global weight to the returned data using the ADD technique. The higher the weight, the better the fit. The personalized database manager classifies the returned data to facilitate the evaluation of the weighted rules. A tool may be used to automatically extract such a classification via data mining.

Independent of how the classification of the individual objects is achieved, objects can be prioritized according to a personal profile. Using the search engine as an example, assume that a person has the following profile: favorite color is blue; income is below $30,000 and has two kids. The selection structure for the search engine may be constructed based on the following rules:

weight 8: color of object is favorite color (which increases the weight of a selected object having the favorite color by 8).

weight 10: income below 30.000=>price of car below $20,000.

weight 6: has children=>has four doors.

In response to a search query for a used car, a personalized search engine will traverse the selection structure to find results and their associated weights, and list the results in an ordered list according to the weights. For example, the personalized search engine may list blue used cars that cost less than $20,000 and have four doors first (weight 19), followed by other cars according to their weights.

List of Other Application Areas

By way of example but not limitation, other applications areas include:

- Personalized advertisement, for example in the area of e-commerce (electronic commerce) (both B2B, B2C and C2C) or m-commerce (mobile commerce),
- Game programming, characterizing game characters by profile and let their actions be chosen on the basis of the weight of possible options. The ADD technique allows the modeling of elaborate characters, which despite their intricacy can react very fast.
- Auction platforms,
- Personalized, situation-dependent organization of workflows,
- Personalized online newspapers and other information services, particularly where there is great call for them to be up-to-date, such as stock market services,
- Tailored support in teaching/learning environments,
- Diagnostic support and diagnostic systems in any area (e.g. vehicle electronics, medicine),
- Matching services and intelligent search engines,
- Customer services and customer care,
- Data mining,
- Search systems implemented in hardware or firmware,
- Conveying and consultancy systems, for example in trade or in the insurance business,
- User guides (e.g. in consumer electronics),
- Knowledge management systems,
- General coordination or rule systems (e.g. process control and monitoring, warning systems, emergency controllers, disaster management),
- Planning systems (e.g. layout design, workflow or phase planning),
- Decision support systems. These also include systems which can be used for security checks. In one specific form, a selection apparatus creates a risk assessment. In one specific form, a security specialist creates a selection description data element for weighting. The generated selection structure data element can be used for risk assessment in situ. In this case, in one specific form, the selection description data element remains secret.
- Range structure and selection,
- Offer compilation (bundling),
- Warehouse administration,
- Marketing design and implementation,
- Customer behavior and market analysis,
- Profile supported decision systems (decision support system),
- Anamnesis assistance, and
- Channel allocation for mobile radio.
- Fast Electronic Stability control
- Real-time vibration control In these or in other application scenarios, the overall concept, the core concept of the generator/evaluator solution, evaluation structures or the concept of rule systems with or without analysis can be usefully used alone or in combination to increase efficiency or for the purpose of suitable modeling.

Figure 6:
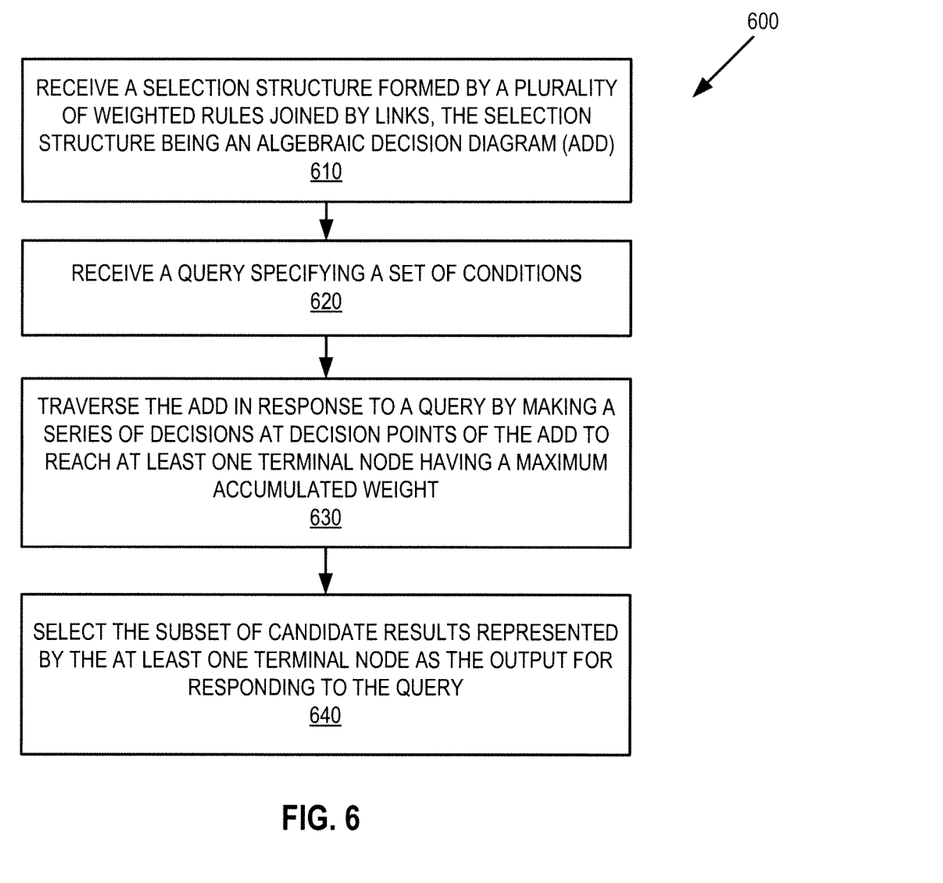
FIG. 6 illustrates a flow diagram describing a selection method according to one embodiment.

FIG. 6 illustrates an example of a method 600 for a real-time system to perform a selection using the selection structure described above. In one embodiment, the real-time system may be one of the systems 130, 150, 180 and 230 of FIG. 1 and FIG. 2. Other embodiments are also contemplated. In one embodiment, the real-time system receives a selection structure formed by weighted rules joined by links, each of the weighted rules including a condition part, a conclusion part and a weight (block 610). The selection structure is an ADD that includes internal nodes each representing a decision point, and terminal nodes each representing a subset of candidate results having an accumulated weight. The real-time system receives a query that specifies a set of conditions (block 620). In response to the query, the real-time system traverses the ADD by making a series of decisions at decision points of the ADD to reach at least one terminal node that has a maximum accumulated weight among terminal nodes that satisfy the set of conditions (block 630). The real-time system then selects the subset of candidate results represented by the at least one terminal node as the output for responding to the query (block 640).

The implementation can respectively be effected using special hardware, hardware/software co-design, or using software on standard hardware. Different embodiments of the invention may be implemented using different combinations of software, firmware, and/or hardware. Thus, the techniques shown in the figures can be implemented using code and data stored and executed on one or more computing devices (e.g., a computer, an electronic device, a network node, etc.). Such computing devices store and transmit (internally and/or with other computing devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such computing devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given computing device typically stores instructions for execution on one or more processors of that computing device. One or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a real-time system for making a selection from a selection structure in response to a query, the method comprising:

receiving an Algebraic Decision Diagram (ADD) of the selection structure generated from a plurality of weighted rules joined by links, each of the weighted rules including a condition part that further includes at least one argument predicate, a conclusion part that further includes at least one result predicate, and a weight, the ADD generated via a sequence of operations, at least one of the operations comprising:
  linking at least two weighted rules to form an intermediate ADD that includes a path connecting one or more internal nodes to a terminal node, wherein each internal node represents a decision point at which the argument predicate is evaluated;
  identifying a set of result predicates that satisfy all argument predicates along the path;
  keeping at least one result predicate in the set of result predicates to be represented by the terminal node, the at least one result predicate having a maximum accumulated weight among the set of result predicates; and
  removing result predicates not having the maximum accumulated weight from the set of result predicates represented by the terminal node;
traversing the ADD in response to the query that specifies a set of argument predicates by making a series of decisions at decision points of the ADD to reach at least one terminal node; and
generating an output including one or more result predicates represented by the at least one terminal node.

2. The method of claim 1, wherein the query includes real-time sensor measurements from operations of a machine, and wherein generating the output further comprises: executing a control action according to the output to adjust the operations of the machine.

3. The method of claim 1, wherein the size of the ADD is reduced by merging multiple terminal nodes and their corresponding internal nodes, wherein accumulated weights of the multiple terminal nodes are within a specified range of a given metric.

4. The method of claim 1, further comprising:
  performing a succession of selections according to a protocol data element that specifies a frequency of selection.

5. The method of claim 1, wherein one or more of the weighted rules are linked by prioritization, which provides an expression indicating which weight rule is to be applied when more than one of the weighted rules can be used.

6. The method of claim 1, wherein the selection structure includes an upstream part of the weighted rules and a downstream part of the weighted rules, wherein actions resulting from the upstream part are executed before the downstream rules are applied.

7. The method of claim 1, wherein the real-time system functions as a personalized search engine that produces a list of search results that are ordered according to accumulated weights indicated in the ADD, and the plurality of weighted rules represent a personal profile of a requester of the search results.

8. The method of claim 1, wherein the real-time system is web server that performs personalized online advertising according to the output, and the plurality of weighted rules represent a personal profile of a potential customer of the personalized online advertising.

9. A method performed by a computer system that generates a selection structure to enable real-time selection in response to a query, the method comprising:
  receiving by the computer system a selection description including a plurality of weighted rules, each of the weighted rules including a condition part that further includes at least one argument predicate, a conclusion part that further includes at least one result predicate, and a weight;
  generating an Algebraic Decision Diagram (ADD) of the selection structure from the plurality of weighted rules joined by links via a sequence of operations, at least one of the operations comprising:
    linking at least two weighted rules to form an intermediate ADD that includes a path connecting one or more internal nodes to a terminal node, wherein each internal node represents a decision point at which the argument predicate is evaluated;
    identifying a set of result predicates that satisfy all argument predicates along the path;
    keeping at least one result predicate in the set of result predicates to be represented by the terminal node, the at least one result predicate having a maximum accumulated weight among the set of result predicates; and
    removing result predicates not having the maximum accumulated weight from the set of result predicates represented by the terminal node; and
  causing a real-time system to traverse the ADD in response to the query that specifies a set of argument predicates to make a series of decisions at decision points of the ADD to reach at least one terminal node, and to generate an output including one or more result predicates represented by the at least one terminal node.

10. The method of claim 9, wherein generating the selection structure further comprises:
  merging multiple terminal nodes and their corresponding internal nodes to thereby reduce the size of the ADD, wherein accumulated weights of the multiple terminal nodes are within a specified range of a given metric.

11. The method of claim 9, wherein the query includes sensor data collected from operation of a machine, and the output to the query is a control action signal that controls the operation of the machine based on the sensor data.

12. The method of claim 9, wherein the real-time system is a server computer that performs target marketing, wherein the query includes advertisement content and the output to the query includes advertisement targets.

13. The method of claim 9, wherein both the condition part and the conclusion part include numerical values, the method further comprising:
  discretizing ranges of values to obtain discretized intervals for use by the condition part and the conclusion part prior to receiving the plurality of weighted rules.

14. The method of claim 9, wherein both the condition part and the conclusion part include numerical values, the method further comprising:
  discretizing ranges of values to obtain discretized intervals for use by the condition part and the conclusion part after receiving the plurality of weighted rules.

15. A non-transitory computer readable storage medium including instructions that, when executed by a processing system, cause the processing system to perform a method for generating a selection structure to enable real-time selection in response to a query, the method comprising:
  receiving a selection description including a plurality of weighted rules, each of the weighted rules including a condition part that further includes at least one argument predicate, a conclusion part that further includes at least one result predicate, and a weight; and
  generating an Algebraic Decision Diagram (ADD) of the selection structure from the plurality of weighted rules joined by links via a sequence of operations, at least one of the operations comprising:

linking at least two weighted rules to form an intermediate ADD that includes a path connecting one or more internal nodes to a terminal node, wherein each internal node represents a decision point at which the argument predicate is evaluated;

identifying a set of result predicates that satisfy all argument predicates along the path;

keeping at least one result predicate in the set of result predicates to be represented by the terminal node, the at least one result predicate having a maximum accumulated weight among the set of result predicates; and     removing result predicates not having the maximum accumulated weight from the set of result predicates represented by the terminal node; and causing a real-time system to traverse the ADD in response to the query that specifies a set of argument predicates to make a series of decisions at decision points of the ADD to reach at least one terminal node, and to generate an output including one or more result predicates represented by the at least one terminal node.

16. The non-transitory computer readable storage medium of claim 15, wherein the size of the ADD is reduced by merging multiple terminal nodes and their corresponding internal nodes, wherein accumulated weights of the multiple terminal nodes are within a specified range of a given metric.

17. The non-transitory computer readable storage medium of claim 15, wherein the selection structure includes an upstream part of the weighted rules and a downstream part of the weighted rules, wherein actions resulting from the upstream part are executed before the downstream rules are applied, and wherein one or more of the weighted rules are linked by prioritization, which provides an expression indicating which weight rule is to be applied when more than one of the weighted rules can be used.

18. The non-transitory computer readable storage medium of claim 15, wherein the ADD is a generalized ADD having a varying degree of branching from one internal node to another internal node.

\* \* \* \* \*